(12) United States Patent
Cadima

(10) Patent No.: US 10,830,450 B2
(45) Date of Patent: Nov. 10, 2020

(54) POWER LIMITED CLOSED LOOP COOKING WITH A GAS BURNER

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 57 days.

(21) Appl. No.: 16/270,658

(22) Filed: Feb. 8, 2019

(65) Prior Publication Data

US 2020/0256563 A1 Aug. 13, 2020

(51) Int. Cl.
| | | |
|---|---|---|
| *F23N 1/02* | (2006.01) | |
| *F24C 3/12* | (2006.01) | |
| *F23N 5/24* | (2006.01) | |
| *A62C 3/00* | (2006.01) | |
| *F23D 14/72* | (2006.01) | |

(52) U.S. Cl.
CPC .............. *F24C 3/12* (2013.01); *A62C 3/006* (2013.01); *F23D 14/72* (2013.01); *F23N 5/245* (2013.01)

(58) Field of Classification Search
CPC .............. A47J 27/0802; A47J 37/1223; A47J 37/1266; A47J 27/002; A47J 27/0817; A47J 27/092; A47J 37/108; A47J 37/1285; A47J 2027/043; A47J 27/004; A47J 27/04; A47J 27/08; A47J 27/0804; A47J 27/09; A47J 36/00; A47J 36/02; A47J 37/044; A47J 37/045; A47J 37/067; A47J 37/0688; A47J 37/0694; A47J 37/0713; A47J 37/079; A47J 37/12; A47J 37/1247; A47J 37/1276; A47J 41/0044; A47J 44/00; F24C 3/085; F24C 3/12; F24C 13/00; F24C 1/04; F24C 1/16; F24C 3/02; F24C 3/027; F24C 3/08; F24C 3/124; F24C 3/126; F24C 7/087; F24C 9/00; A62C 3/006
See application file for complete search history.

(56) References Cited

U.S. PATENT DOCUMENTS

| | | | |
|---|---|---|---|
| 5,213,091 A | * | 5/1993 | Beach ..................... F24C 3/126 126/299 D |
| 6,554,197 B2 | | 4/2003 | Marbach et al. |
| 2004/0016348 A1 | | 1/2004 | Sharpe |

(Continued)

FOREIGN PATENT DOCUMENTS

| | | |
|---|---|---|
| CN | 201701051 U | 1/2011 |
| CN | 107048976 A | 8/2017 |
| JP | 03751358 B2 | 3/2006 |

*Primary Examiner* — Jason Lau
(74) *Attorney, Agent, or Firm* — Dority & Manning, P.A.

(57) ABSTRACT

A gas burner assembly and a method of operating the same are provided. The gas burner assembly includes a gas burner and a fuel regulating device for providing a flow of fuel to the gas burner to heat a cooking utensil. The method is a closed loop cooking method that includes monitoring the temperature of the cooking utensil and adjusting the power output of the burner accordingly to drive the utensil temperature to a target cooking temperature or profile. However, the burner power is limited to a maximum fuel flow rate, e.g., to ensure safe operation and to prevent the flames from the gas burner from engulfing the sides of the cooking utensil.

16 Claims, 11 Drawing Sheets

(56) References Cited

U.S. PATENT DOCUMENTS

| | | | |
|---|---|---|---|
| 2005/0242086 A1* | 11/2005 | Imura | G06K 7/10336 |
| | | | 219/627 |
| 2007/0145032 A1* | 6/2007 | Graham | F23L 9/02 |
| | | | 219/392 |
| 2018/0010804 A1* | 1/2018 | Bach | F24C 3/126 |

* cited by examiner

POWER LIMITED CLOSED LOOP COOKING WITH A GAS BURNER

FIELD OF THE INVENTION

The present subject matter relates generally to gas burners, and more particularly to gas burners capable of safely implementing closed loop cooking routines.

BACKGROUND OF THE INVENTION

Conventional gas cooking appliances have one or more gas burners, e.g., positioned at a cooktop surface for use in heating or cooking an object, such as a cooking utensil and its contents. These gas burners typically combust a mixture of gaseous fuel and air to generate heat for cooking. Known burners frequently include an orifice, a Venturi mixing throat, and a plurality of flame ports. The orifice ejects a jet of gaseous fuel which entrains air while passing through the Venturi mixing throat. The air and gaseous fuel mix within the Venturi mixing throat before the mixture is combusted at the flame ports of the burners. Such burners are generally referred to as naturally aspirated gas burners. Certain cooking appliance further include forced air or boost gas burners which include a fan or air pump that supplies pressurized air for mixing with the jet of gaseous fuel for increased power output.

In addition, conventional electric cooktops may include closed loop control methods where a controller monitors the pan temperature and adjusts the burner power accordingly to achieve a target temperature. Such electric cooktops allow users to benefit from assisted cooking tasks and provide precision control over pan temperatures. However, executing such a control scheme on a gas burner introduces potential safety and performance issues. For example, users of gas cooktops are instructed (via use and care manuals for cooking products) to size the flames of the burner to the pan when in use, e.g., to ensure the flames do not exceed the safe capacity of the cookware or otherwise reach up and engulf the sides of the cookware. However, conventional control algorithms do not adequately compensate for such pan limits, resulting in potential safety hazards when implementing closed loop cooking routines.

Accordingly, a cooktop appliance including gas burners capable of safely performing assisted cooking routines would be desirable. More specifically, a gas burner that may perform closed loop cooking while maintaining burner flames at a suitable power appropriate for the cooking utensil being used would be particularly beneficial.

BRIEF DESCRIPTION OF THE INVENTION

Aspects and advantages of the invention will be set forth in part in the following description, or may be apparent from the description, or may be learned through practice of the invention.

In a first example embodiment, a cooktop appliance is provided including a gas burner for receiving a cooking utensil and a fuel regulating device operably coupled to the gas burner for regulating a flow of fuel to the gas burner. A controller is operably coupled to the fuel regulating device for obtaining a target cooking temperature, determining a maximum fuel flow rate for the cooking utensil, and receiving a measured temperature of the cooking utensil heated by the gas burner. The controller is further configured for regulating a flow rate of the flow of fuel using the fuel regulating device to adjust the measured temperature of the cooking utensil to the target cooking temperature, wherein the flow rate is limited to the maximum fuel flow rate for the cooking utensil.

In a second example embodiment, a method of operating a gas burner assembly is provided. The gas burner assembly includes a gas burner and a fuel regulating device for providing a flow of fuel to the gas burner to heat a cooking utensil. The method includes obtaining a target cooking temperature, determining a maximum fuel flow rate for the cooking utensil, and receiving a measured temperature of the cooking utensil. The method further includes operating the fuel regulating device to regulate a flow rate of the flow of fuel to adjust the measured temperature of the cooking utensil to the target cooking temperature and limiting the flow rate of the flow of fuel at or below the maximum fuel flow rate for the cooking utensil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
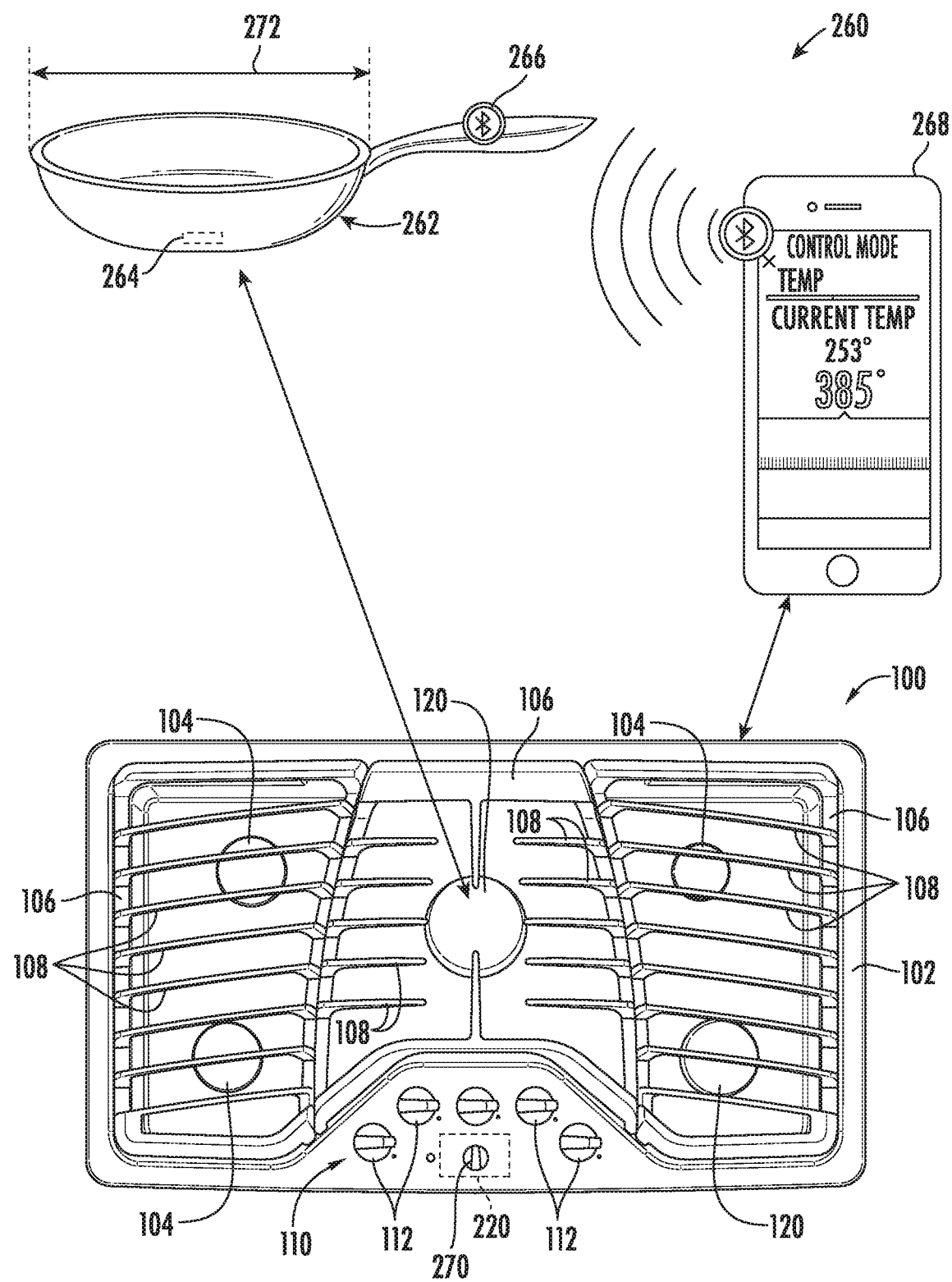
FIG. 1 provides a top, schematic view of a closed loop cooking system including a cooktop appliance according to an example embodiment of the present disclosure.
Figure 2:
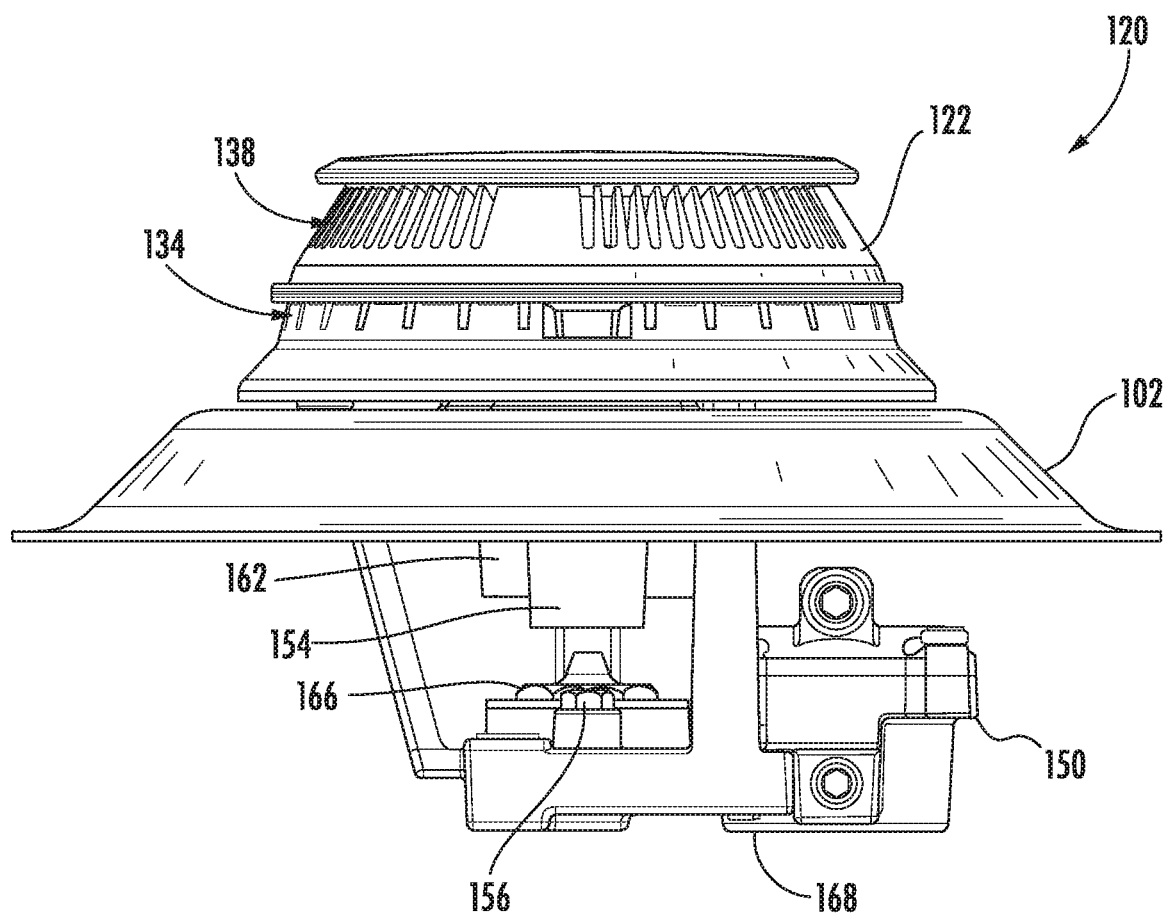
FIG. 2 is a side elevation view of a gas burner assembly that may be used with the exemplary cooktop appliance of FIG. 1 according to an exemplary embodiment of the present subject matter.
Figure 3:
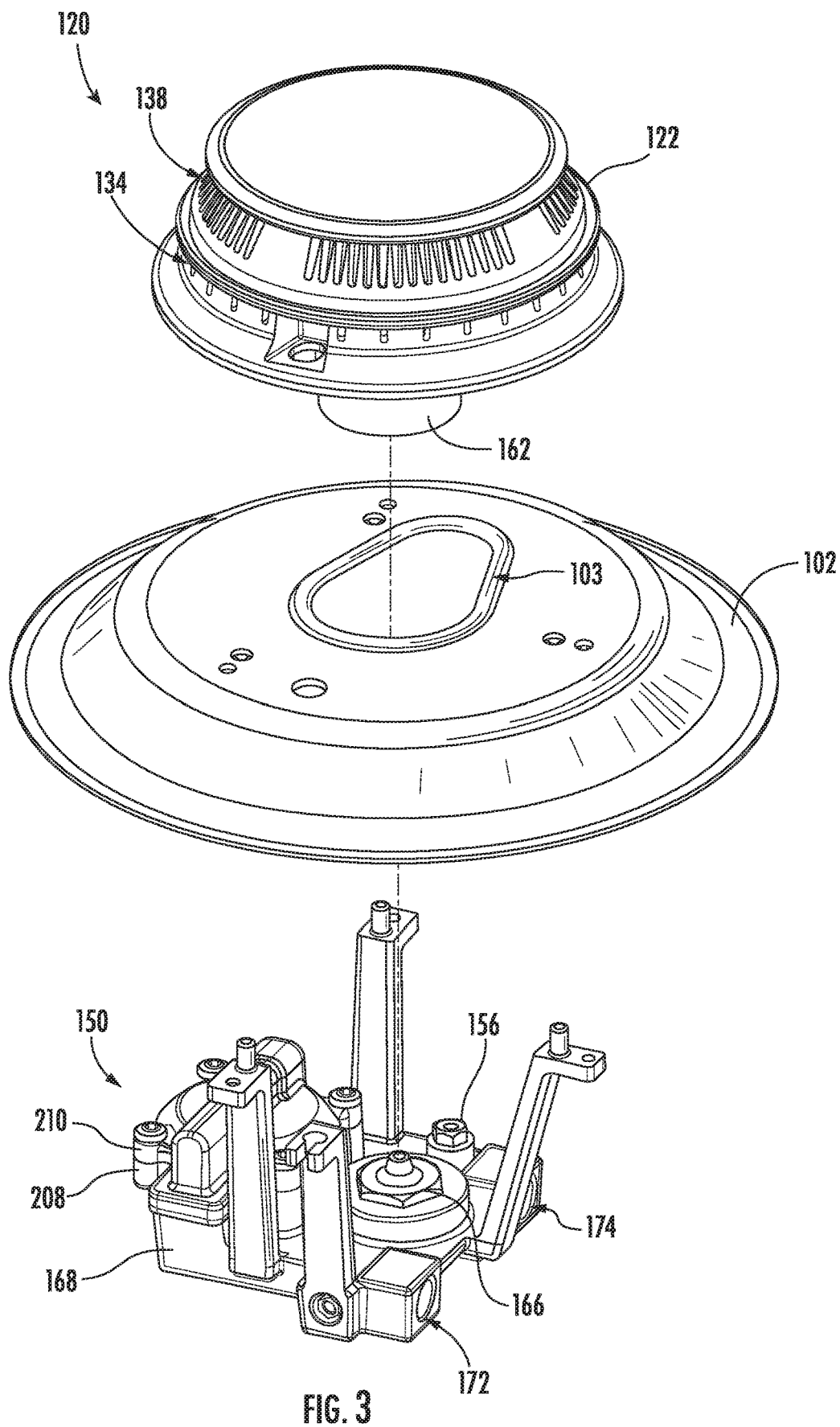
FIG. 3 is an exploded view of the example gas burner of assembly FIG. 2.
Figure 4:
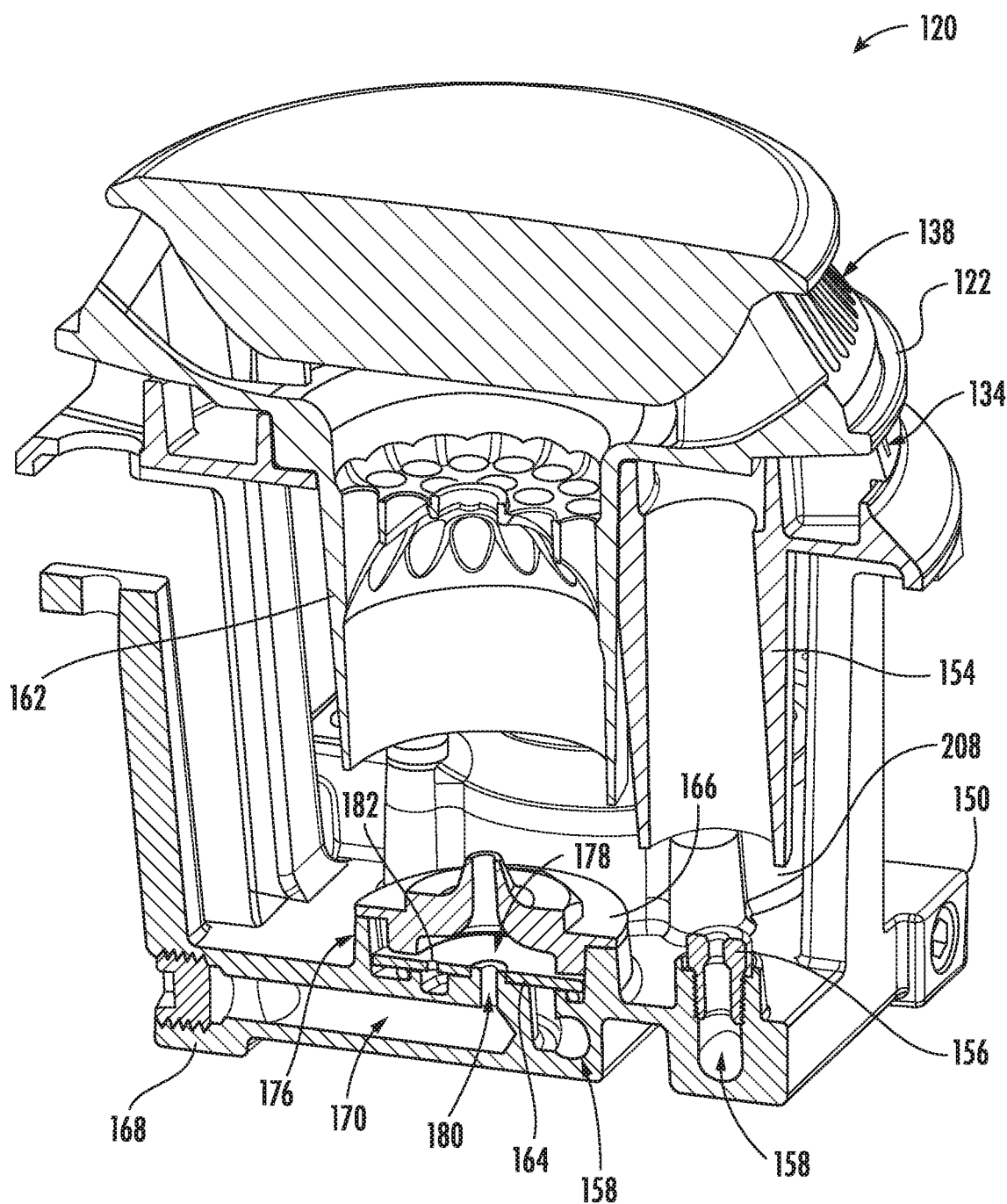
FIG. 4 is a section view of the example gas burner assembly of FIG. 2.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure relates generally to a gas burner for a cooktop appliance 100 and methods for operating the same. Although cooktop appliance 100 is used below for the purpose of explaining the details of the present subject matter, it will be appreciated that the present subject matter may be used in or with any other suitable appliance in alternative example embodiments. For example, the gas burner described below may be used on other types of cooking appliances, such as single or double oven range appliances. Cooktop appliance 100 is used in the discussion below only for the purpose of explanation, and such use is not intended to limit the scope of the present disclosure to any particular style of appliance or burner.

FIG. 1 illustrates an exemplary embodiment of a cooktop appliance 100 of the present disclosure. Cooktop appliance 100 may be, e.g., fitted integrally with a surface of a kitchen counter, may be configured as a slide-in cooktop unit, or may be a part of a free-standing range cooking appliance. Cooktop appliance 100 includes a top panel 102 that includes one or more heating sources, such as heating elements 104 for use in, e.g., heating or cooking. Top panel 102, as used herein, refers to any upper surface of cooktop appliance 100 on which utensils may be heated and therefore food cooked. In general, top panel 102 may be constructed of any suitably rigid and heat resistant material capable of supporting heating elements 104, cooking utensils, and/or other components of cooktop appliance 100. By way of example, top panel 102 may be constructed of enameled steel, stainless steel, glass, ceramics, and combinations thereof.

According to the illustrated embodiment, cooktop appliance 100 is generally referred to as a "gas cooktop," and heating elements 104 are gas burners. For example, one or more of the gas burners in cooktop appliance 100 may be a gas burner 120 described below. As illustrated, heating elements 104 are positioned on and/or within top panel 102 and have various sizes, as shown in FIG. 1, so as to provide for the receipt of cooking utensils (i.e., pots, pans, etc.) of various sizes and configurations and to provide different heat inputs for such cooking utensils.

In addition, cooktop appliance 100 may include one or more grates 106 configured to support a cooking utensil, such as a pot, pan, etc. In general, grates 106 include a plurality of elongated members 108, e.g., formed of cast metal, such as cast iron. The cooking utensil may be placed on the elongated members 108 of each grate 106 such that the cooking utensil rests on an upper surface of elongated members 108 during the cooking process. Heating elements 104 are positioned underneath the various grates 106 such that heating elements 104 provide thermal energy to cooking utensils above top panel 102 by combustion of fuel below the cooking utensils.

According to the illustrated example embodiment, a user interface panel or control panel 110 is located within convenient reach of a user of cooktop appliance 100. For this example embodiment, control panel 110 includes control knobs 112 that are each associated with one of heating elements 104. Control knobs 112 allow the user to activate each heating element 104 and regulate the amount of heat input each heating element 104 provides to a cooking utensil located thereon, as described in more detail below. Although cooktop appliance 100 is illustrated as including control knobs 112 for controlling heating elements 104, it will be understood that control knobs 112 and the configuration of cooktop appliance 100 shown in FIG. 1 is provided by way of example only. More specifically, control panel 110 may include various input components, such as one or more of a variety of touch-type controls, electrical, mechanical or electro-mechanical input devices including rotary dials, push buttons, and touch pads.

According to the illustrated embodiment, control knobs 112 are located within control panel 110 of cooktop appliance 100. However, it should be appreciated that this location is used only for the purpose of explanation, and that other locations and configurations of control panel 110 and control knobs 112 are possible and within the scope of the present subject matter. Indeed, according to alternative embodiments, control knobs 112 may instead be located directly on top panel 102 or elsewhere on cooktop appliance 100, e.g., on a backsplash, front bezel, or any other suitable surface of cooktop appliance 100. Control panel 110 may also be provided with one or more graphical display devices, such as a digital or analog display device designed to provide operational feedback to a user.

Turning now to FIGS. 2 through 8, a gas burner 120 according to an example embodiment of the present disclosure is described. Gas burner 120 may be used in cooktop appliance 100, e.g., as one of heating elements 104. Thus, gas burner 120 is described in greater detail below in the context of cooktop appliance 100. However, it will be understood that gas burner 120 may be used in or with any other suitable cooktop appliance in alternative example embodiments.

Gas burner 120 includes a burner body 122. Burner body 122 generally defines a first burner ring or stage (e.g., a primary burner 130) and a second burner ring or stage (e.g., a boost burner 132). More specifically, primary burner 130 generally includes a plurality of naturally aspirated or primary flame ports 134 and a primary fuel chamber 136 which are defined at least in part by burner body 122. Similarly, boost burner 132 generally includes a plurality of forced air or boost flame ports 138 and a boost fuel chamber 140 which are defined at least in part by burner body 122.

As illustrated, primary flame ports 134 and boost flame ports 138 may both be distributed in rings on burner body 122. In addition, primary flame ports 134 may be positioned concentric with boost flame ports 138. Further, primary flame ports 134 (and primary burner 130) may be positioned below boost flame ports 138 (and boost burner 132). Such positioning of primary burner 130 relative to boost burner 132 may improve combustion of gaseous fuel when gas burner assembly 120 is set to the boost position. For example, flames at primary burner 130 may assist with lighting gaseous fuel at boost burner 132 due to the position of primary burner 130 below boost burner 132.

With reference to FIGS. 2 through 8, gas burner 120 also includes an injet assembly 150. Injet assembly 150 may be positioned below top panel 102, e.g., below an opening 103 (FIG. 3) of top panel 102. Conversely, burner body 122 may be positioned on top panel 102, e.g., over opening 103 of top panel 102. Thus, burner body 122 may cover opening 103 of top panel 102 when burner body 122 is positioned on top panel 102. When burner body 122 is removed from top panel 102, injet assembly 150 below top panel 102 is accessible through opening 103. Thus, e.g., a fuel orifice(s) of gas burner 120 on injet assembly 150 may be accessed by removing burner body 122 from top panel 102, and an installer may reach through opening 103 (e.g., with a wrench or other suitable tool) to change out the fuel orifice(s) of gas burner 120.

Injet assembly 150 is configured for directing a flow of gaseous fuel to primary flame ports 134 of burner body 122. Thus, injet assembly 150 may be coupled to a gaseous fuel source 152, as described in more detail below with reference to FIG. 10. During operation of gas burner 120, gaseous fuel from gaseous fuel source 152 may flow from injet assembly 150 into a vertical Venturi mixing tube 154. In particular, injet assembly 150 includes a first gas orifice 156 that is in fluid communication with a gas passage 158. A jet of gaseous fuel from gaseous fuel source 152 may exit injet assembly 150 at first gas orifice 156 and flow towards vertical Venturi mixing tube 154. Between first gas orifice 156 and vertical Venturi mixing tube 154, the jet of gaseous fuel from first gas orifice 156 may entrain air into vertical Venturi mixing tube 154. Air and gaseous fuel may mix within vertical Venturi mixing tube 154 prior to flowing into primary fuel chamber 136 and through primary flame ports 134 where the mixture of air and gaseous fuel may be combusted.

Injet assembly 150 is also configured for directing a flow of air and gaseous fuel to boost flame ports 138 of burner body 122. Thus, as discussed in greater detail below, injet assembly 150 may be coupled to pressurized air source 160 in addition to gaseous fuel source 152. During boosted operation of gas burner 120, a mixed flow of gaseous fuel from gaseous fuel source 152 and air from pressurized air source 160 may flow from injet assembly 150, through an inlet tube 162, and into boost fuel chamber 140 prior to flowing to boost flame ports 138 where the mixture of gaseous fuel and air may be combusted at boost flame ports 138.

In addition to first gas orifice 156, injet assembly 150 also includes a second gas orifice 164, a mixed outlet nozzle 166, and an injet body 168. Injet body 168 defines an air passage 170 and gas passage 158. Air passage 170 may be in fluid communication with pressurized air source 160. For example, a pipe or conduit may extend between pressurized air source 160 and injet body 168, and pressurized air from pressurized air source 160 may flow into air passage 170 via such pipe or conduit. Gas passage 158 may be in fluid communication with gaseous fuel source 152. For example, a pipe or conduit may extend between gaseous fuel source 152 and injet body 168, and gaseous fuel from gaseous fuel source 152 may flow into gas passage 158 via such pipe or conduit. In certain example embodiments, injet body 168 defines a single inlet 172 for air passage 170 through which the pressurized air from pressurized air source 160 may flow into air passage 170, and injet body 168 defines a single inlet 174 for gas passage 158 through which the pressurized air from gaseous fuel source 152 may flow into gas passage 158.

First gas outlet orifice 156 is mounted to injet body 168, e.g., at a first outlet of gas passage 158. Thus, gaseous fuel from gaseous fuel source 152 may exit gas passage 158 through first gas outlet orifice 156, and gas passage 158 is configured for directing a flow of gaseous fuel through injet body 168 to first gas outlet orifice 156. On injet body 168, first gas outlet orifice 156 is oriented for directing a flow of gaseous fuel towards vertical Venturi mixing tube 154 and/or primary flame ports 134, as discussed above.

Second gas orifice 164 and injet body 168, e.g., collectively, form an eductor mixer 176 within a mixing chamber 178 of injet body 168. Eductor mixer 176 is configured for mixing pressurized air from air passage 170 with gaseous fuel from gas passage 158 in mixing chamber 178. In particular, an outlet 180 of air passage 170 is positioned at mixing chamber 178. A jet of pressurized air from pressurized air source 160 may flow from air passage 170 into mixing chamber 178 via outlet 180 of air passage 170. Second gas orifice 164 is positioned within injet body 168 between mixing chamber 178 and gas passage 158. Gaseous fuel from gaseous fuel source 152 may flow from gas passage 158 into mixing chamber 178 via second gas orifice 164. As an example, second gas orifice 164 may be a plate that defines a plurality of through holes 182, and the gaseous fuel in gas passage 158 may flow through holes 182 into mixing chamber 178.

The jet of pressurized air flowing into mixing chamber 178 via outlet 180 of air passage 170 may draw and entrain gaseous fuel flowing into mixing chamber 178 via second gas orifice 164. In addition, as the gaseous fuel is entrained into the air, a mixture of air and gaseous fuel is formed within mixing chamber 178. From mixing chamber 178, the mixture of air and gaseous fuel may flow from mixing chamber 178 via mixed outlet nozzle 166. In particular, mixed outlet nozzle 166 is mounted to injet body 168 at mixing chamber 178, and mixed outlet nozzle 166 is oriented on injet body 168 for directing the mixed flow of air and gaseous fuel from mixing chamber 178, through inlet tube 162, into boost fuel chamber 140, and/or towards boost flame ports 138, as discussed above.

Burner body 122 may be positioned over injet body 168, e.g., when burner body 122 is positioned on top panel 102. In addition, first gas orifice 156 may be oriented on injet body 168 such that first gas orifice 156 directs the flow of gaseous fuel upwardly towards vertical Venturi mixing tube 154 and primary flame ports 134. Similarly, mixed outlet nozzle 166 may be oriented on injet body 168 such that mixed outlet nozzle 166 directs the mixed flow of air and gaseous fuel upwardly towards inlet tube 162 and boost flame ports 138.

First and second gas orifices 156, 164 may be removeable from injet body 168. First and second gas orifices 156, 164 may also be positioned on injet body 168 directly below burner body 122, e.g., when burner body 122 is positioned on top panel 102. Thus, e.g., first and second gas orifices 156, 164 may be accessed by removing burner body 122 from top panel 102, and an installer may reach through opening 103 (e.g., with a wrench or other suitable tool) to change out first and second gas orifices 156, 164.

Injet assembly 150 also includes a pneumatically actuated gas valve 200. Pneumatically actuated gas valve 200 may be positioned within injet body 168, and pneumatically actuated gas valve 200 is adjustable between a closed configuration and an open configuration. In the closed configuration, pneumatically actuated gas valve 200 blocks the flow of gaseous fuel through gas passage 158 to second gas orifice 164, eductor mixer 176, and/or mixed outlet nozzle 166. Conversely, pneumatically actuated gas valve 200 permits the flow of gaseous fuel through gas passage 158 to second gas orifice 164/eductor mixer 176 in the open configuration. Pneumatically actuated gas valve 200 is configured to adjust from the closed configuration to the open configuration in response to the flow of air through air passage 170 to outlet 180 of air passage 170. Thus, e.g., pneumatically actuated gas valve 200 is in fluid communication with air passage 170 and opens in response to air passage 170 being pressurized by air from pressurized air source 160. As an example, pneumatically actuated gas valve 200 may be positioned on a branch of air passage 170 relative to outlet 180 of air passage 170.

It will be understood that first gas outlet orifice 156 may be in fluid communication with gas passage 158 in both the open and closed configurations of pneumatically actuated gas valve 200. Thus, first gas outlet orifice 156 may be positioned on gas passage 158 upstream of pneumatically actuated gas valve 200 relative to the flow of gas through gas passage 158. Thus, e.g., pneumatically actuated gas valve 200 may not regulate the flow of gas through second gas orifice 164 but not first gas outlet orifice 156.

Figure 5:
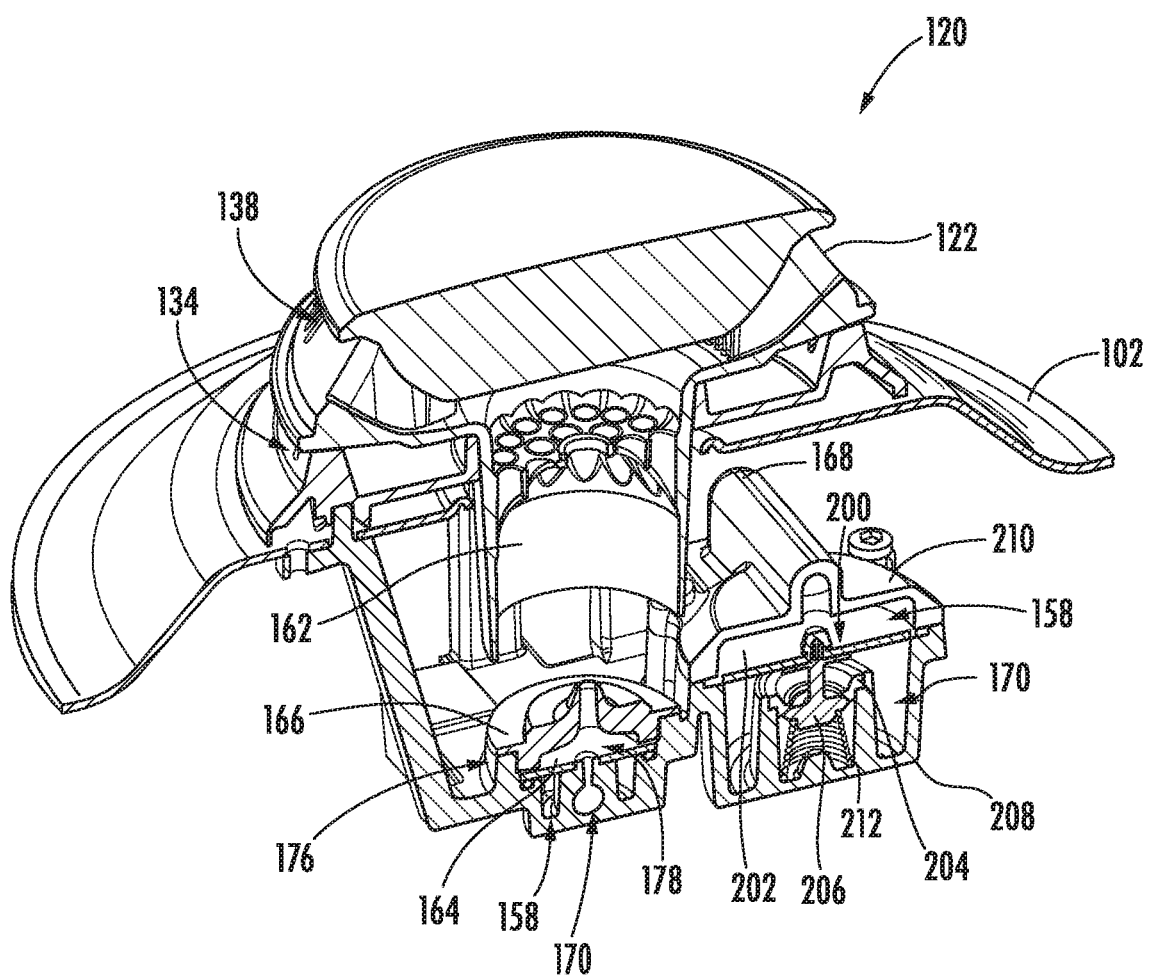
FIG. 5 is another section view of the example gas burner assembly of FIG. 2.
Figure 6:
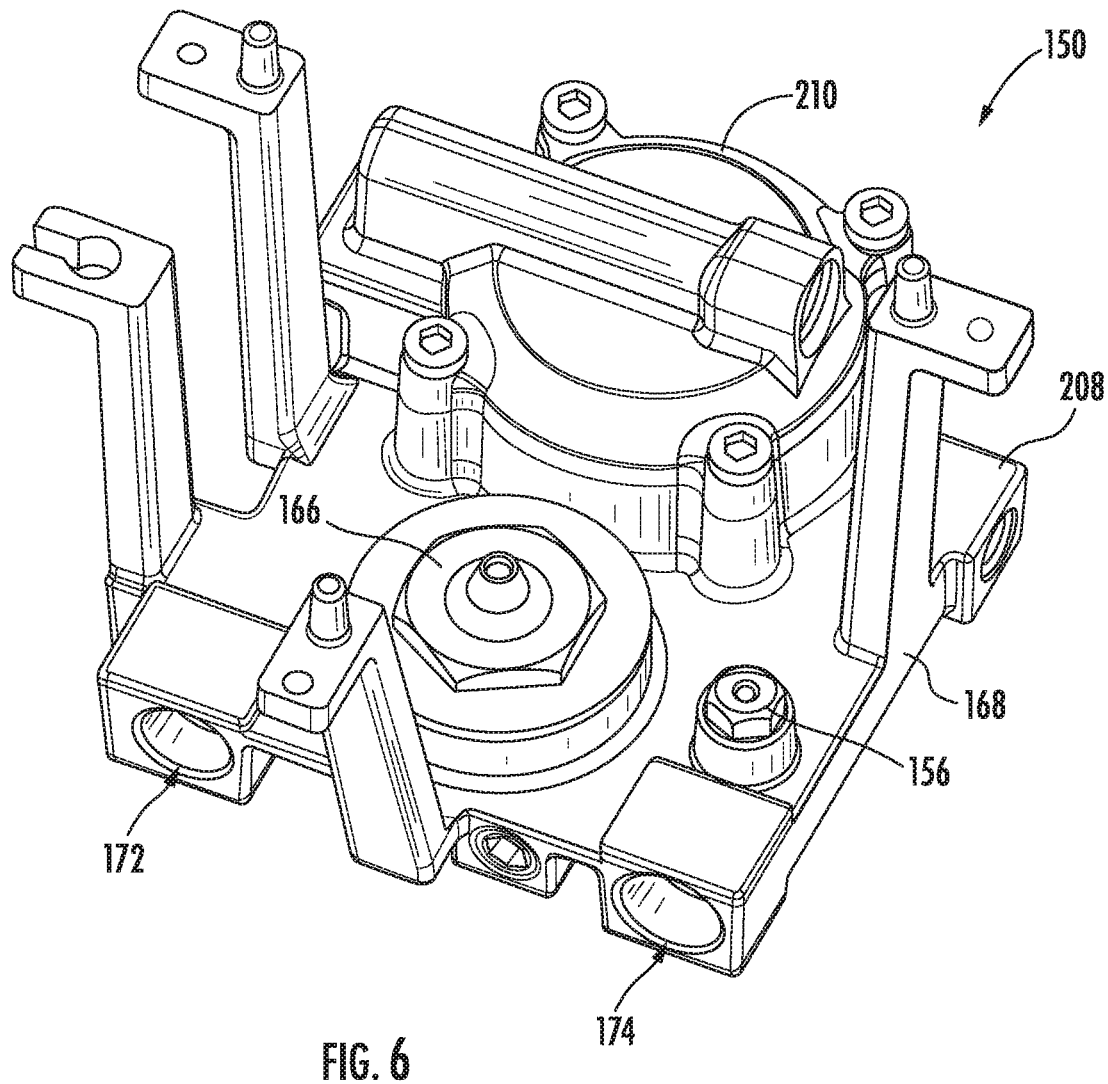
FIG. 6 is a perspective view of an injet of the example gas burner assembly of FIG. 2.
Figure 7:
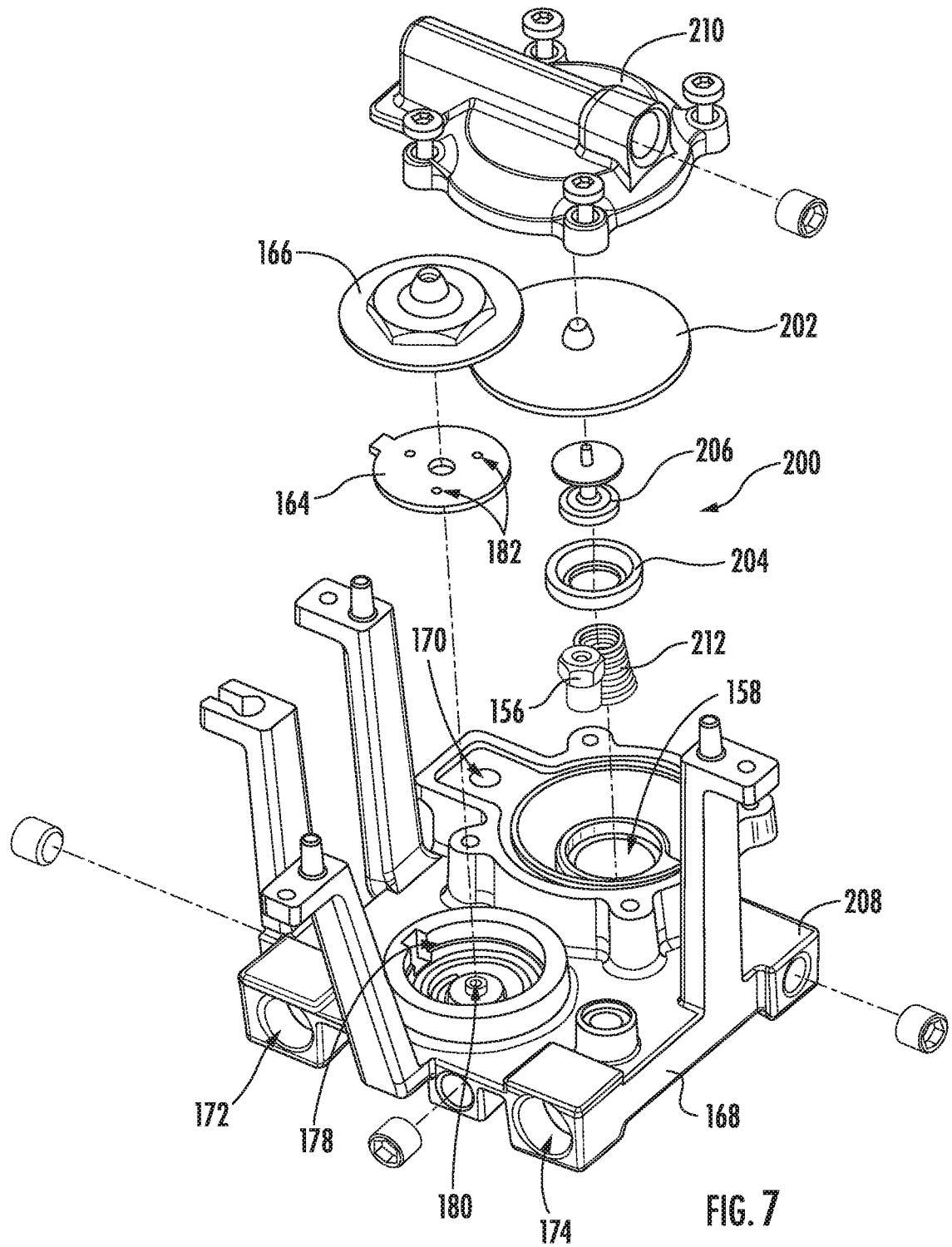
FIG. 7 is an exploded view of the injet of FIG. 7.
Figure 8:
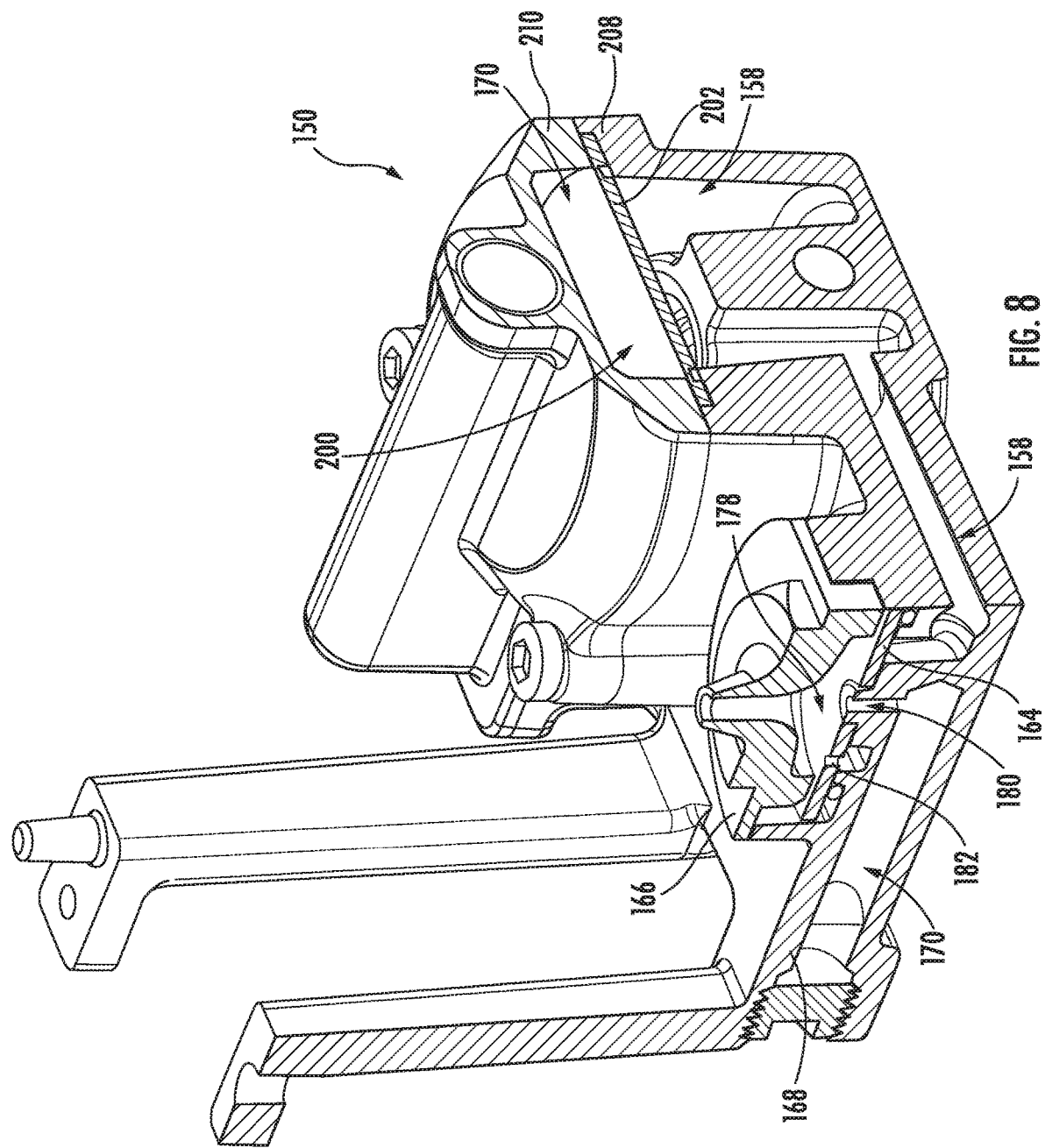
FIG. 8 is a section view of the injet of FIG. 7.

As shown in FIGS. 5 and 7, pneumatically actuated gas valve 200 includes a diaphragm 202, a seal 204, and a plug 206. Diaphragm 202 is positioned between air passage 170 and gas passage 158 within injet body 168. For example, diaphragm 202 may be circular and may be clamped between a first injet body half 208 and a second injet body half 210. In particular, first and second injet body halves 208, 210 may be fastened together with diaphragm 202 positioned between first and second injet body halves 208, 210.

Seal 204 is mounted to injet body 168 within gas passage 158. Plug 206 is mounted to diaphragm 202, e.g., such that plug 206 travels with diaphragm 202 when diaphragm 202 deforms. Plug 206 is positioned against seal 204 when pneumatically actuated gas valve 200 is closed. A spring 212 may be coupled to plug 206. Spring 212 may urge plug 206 towards seal 204. Thus, pneumatically actuated gas valve 200 may be normally closed.

When air passage 170 is pressurized by air from pressurized air source 160, diaphragm 202 may deform due to the pressure of air in air passage 170 increasing, and plug 206 may shift away from seal 204 as diaphragm 202 deforms. In such a manner, diaphragm 202, seal 204, and plug 206 may cooperate to open pneumatically actuated gas valve 200 in response to air passage 170 being pressurized by air from pressurized air source 160. Conversely, diaphragm 202 may return to an undeformed state when air passage 170 is no longer pressurized by air from pressurized air source 160, and plug 206 may shift against seal 204. In such a manner, diaphragm 202, seal 204 and plug 206 may cooperate to close pneumatically actuated gas valve 200 in response to air passage 170 no longer being pressurized by air from pressurized air source 160.

Operation of cooktop appliance 100 and gas burner assemblies 120 may be controlled by electromechanical switches or by a controller or processing device 220 (FIGS. 1 and 9) that is operatively coupled to control panel 110 for user manipulation, e.g., to control the operation of heating elements 104. In response to user manipulation of control panel 110 (e.g., via control knobs 112 and/or a touch screen interface), controller 220 operates the various components of cooktop appliance 100 to execute selected instructions, commands, or other features.

As described in more detail below with respect to FIG. 9, controller 220 may include a memory and microprocessor, such as a general or special purpose microprocessor operable to execute programming instructions or micro-control code associated with appliance operation. Alternatively, controller 220 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 110 and other components of cooktop appliance 100 may be in communication with controller 220 via one or more signal lines or shared communication busses.

Figure 9:
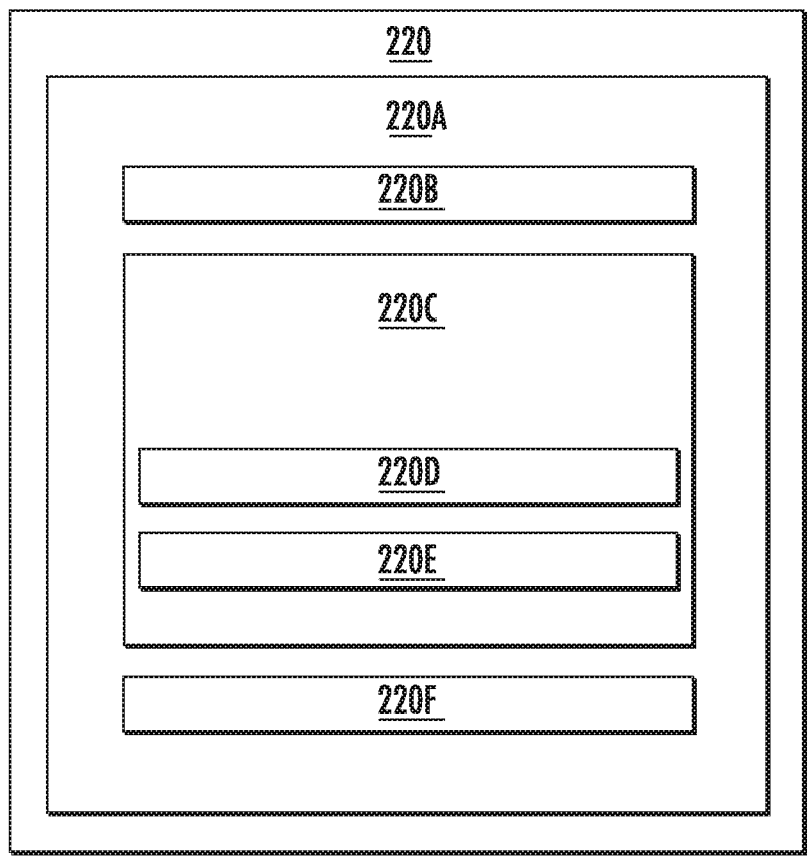
FIG. 9 depicts certain components of a controller according to example embodiments of the present subject matter.

FIG. 9 depicts certain components of controller 220 according to example embodiments of the present disclosure. Controller 220 can include one or more computing device(s) 220A which may be used to implement methods as described herein. Computing device(s) 220A can include one or more processor(s) 220B and one or more memory device(s) 220C. The one or more processor(s) 220B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 220C can include one or more non-transitory computer-readable storage medium(s), such as RAM, ROM, EEPROM, EPROM, flash memory devices, magnetic disks, etc., and/or combinations thereof.

The memory device(s) 220C can include one or more computer-readable media and can store information accessible by the one or more processor(s) 220B, including instructions 220D that can be executed by the one or more processor(s) 220B. For instance, the memory device(s) 220C can store instructions 220D for running one or more software applications, displaying a user interface, receiving user input, processing user input, etc. In some implementations, the instructions 220D can be executed by the one or more processor(s) 220B to cause the one or more processor(s) 220B to perform operations, e.g., such as one or more portions of methods described herein. The instructions 220D can be software written in any suitable programming language or can be implemented in hardware. Additionally, and/or alternatively, the instructions 220D can be executed in logically and/or virtually separate threads on processor(s) 220B.

The one or more memory device(s) 220C can also store data 220E that can be retrieved, manipulated, created, or stored by the one or more processor(s) 220B. The data 220E can include, for instance, data to facilitate performance of methods described herein. The data 220E can be stored in one or more database(s). The one or more database(s) can be connected to controller 220 by a high bandwidth LAN or WAN, or can also be connected to controller through one or more networks (not shown). The one or more database(s) can be split up so that they are located in multiple locales. In some implementations, the data 220E can be received from another device.

The computing device(s) 220A can also include a communication module or interface 220F used to communicate with one or more other component(s) of controller 220 or cooktop appliance 100 over the network. The communication interface 220F can include any suitable components for interfacing with one or more network(s), including for example, transmitters, receivers, ports, controllers, antennas, or other suitable components.

Figure 10:
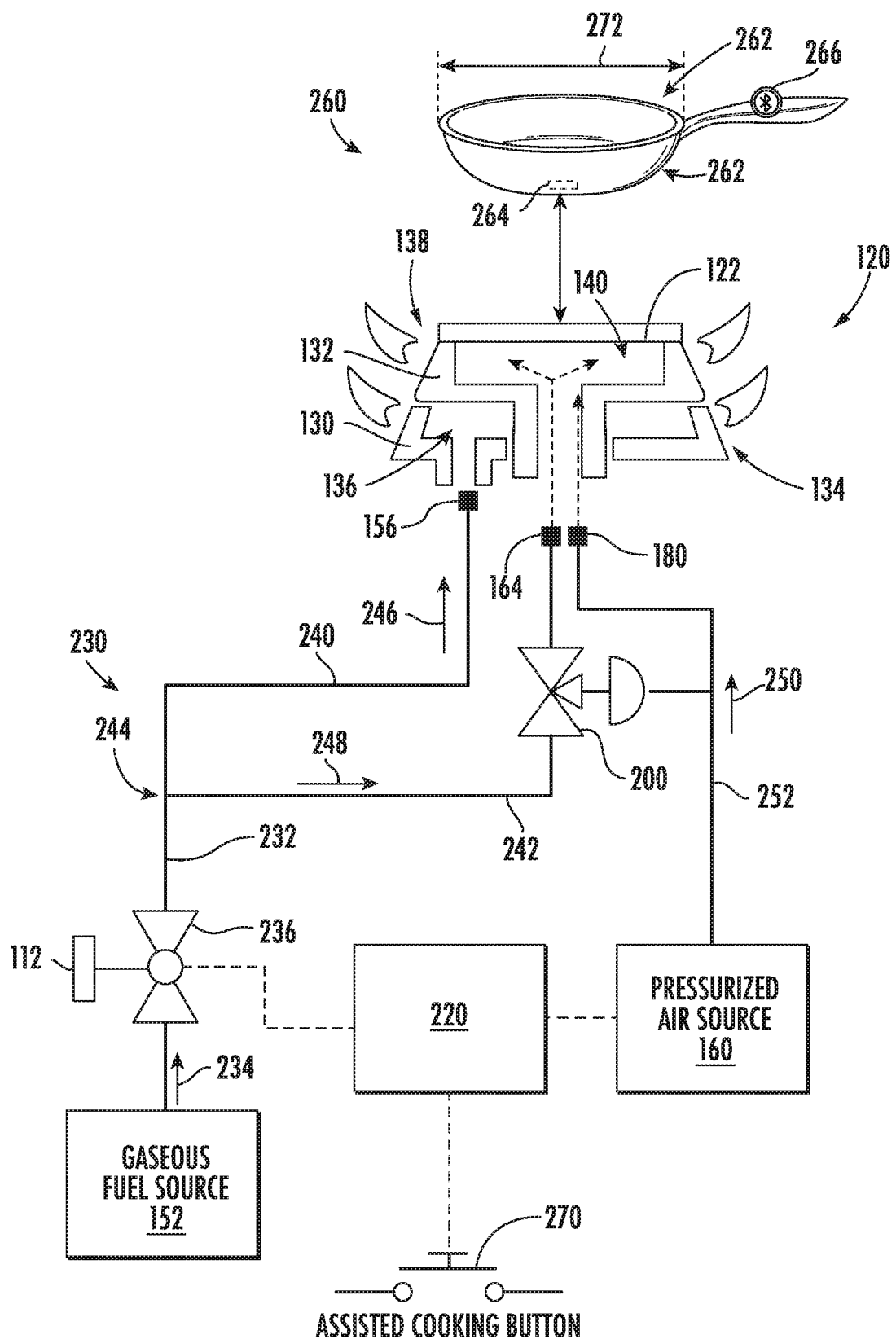
FIG. 10 is a schematic view of a gas burner assembly and a fuel supply system according to an example embodiment of the present subject matter.

Referring now to FIG. 10, a schematic view of gas burner assembly 120 and a fuel supply system 230 will be described. In general, fuel supply system 230 is configured for selectively supplying gaseous fuel such as propane or natural gas to primary burner 130 and boost burner 132 to regulate the amount of heat generated by the respective stages. In particular, fuel supply system 230 is configured for selectively supplying gaseous fuel to only primary burner 130 or to both primary burner 130 and boost burner 132 depending upon the desired output of gas burner assembly 120 selected by a user of gas burner assembly 120. Thus, primary burner 130 is separate or independent from boost burner 132, e.g., such that primary burner 130 is not in fluid communication with boost burner 132 within gas burner assembly 120. In such manner, gaseous fuel within gas burner assembly 120 does not flow between primary burner 130 and boost burner 132.

As shown in FIG. 10, fuel supply system 230 includes a supply line 232 that may be coupled to pressurized gaseous fuel source 152, such as a natural gas supply line or a propane tank. In this manner, a flow of supply fuel (indicated by arrow 234), such as gaseous fuel (e.g., natural gas or propane), is flowable from the pressurized gaseous fuel source 152 into supply line 232. Fuel supply system 230 further includes a control valve or a fuel regulating device 236 operably coupled to supply line 232 for selectively directing a metered amount of fuel to primary burner 130 and boost burner 132.

More specifically, according to an exemplary embodiment, control knob 112 may be operably coupled to fuel regulating device 236 for regulating the flow of supply fuel 234. In this regard, a user may rotate control knob 112 to adjust the position of fuel regulating device 236 and the flow of supply fuel 234 through supply line 232. In particular, gas burner assembly 120 may have a respective heat output at each position of control knob 112 (and fuel regulating device 236), e.g., an off, high, medium, and low position. In addition, control knob 112 may be rotated to a lighting position to supply a suitable amount of gaseous fuel to primary burner 130 for ignition, which may be simultaneously achieved using, e.g., a spark electrode (not shown).

As best shown in FIG. 10, supply line 232 is split into a first branch (e.g., a primary fuel conduit 240) and a second branch (e.g., a boost fuel conduit 242) at a junction 244, e.g., via a plumbing tee, wye, or any other suitable splitting device. In general, primary fuel conduit 240 extends from junction 244 to an orifice for primary flame ports 134 (such as first gas orifice 156), which is positioned for directing a flow of primary fuel 246 into gas burner assembly 120, or more particularly into primary burner 130. Similarly, boost fuel conduit 242 extends from junction 244 to an orifice for boost flame ports 138 (such as second gas orifice 164 or holes 182 defined therein), which is positioned for directing a flow of boost fuel 248 into boost burner 132. Thus, supply line 232 is positioned upstream of primary and boost fuel conduits 240, 242 relative to a flow of gaseous fuel from fuel source 152 and primary and boost fuel conduits 240, 242 may separately supply the gaseous fuel from supply line 232 to primary burner 130 and boost burner 132.

As explained above, boost burner 132 is a forced air or mechanically aspirated burner. As illustrated, fuel supply system 230 includes a pressurized air source 160 which is generally configured for providing the flow of combustion air 250 to boost burner 132 for mixing with boost flow of fuel 248. In this regard, for example, fuel supply system 230 includes an air supply conduit 252 that provides fluid communication between pressurized air source 160 and boost fuel chamber 140, or more specifically, outlet 180 of air passage 172. It should be appreciated that any suitable type, position, and configuration of pressurized air source 160 is possible and within the scope of the present subject matter. For example, according to an exemplary embodiment, pressurized air source 160 may be a bellows-style air pump, a fan, such as an axial or centrifugal fan, or any other device suitable for urging a flow of combustion air, such as an air compressor or a centralized compressed air system.

Pressurized air source 160 may be configured for supplying the flow of combustion air 250 at any suitable gage pressure, such as a half to one psig.

As described above, fuel supply system 230 includes pneumatically actuated gas valve 200, which is a pressure controlled valve operably coupled with pressurized air source 160 and to boost fuel conduit 242. Pneumatically actuated gas valve 200 is generally configured for regulating the flow of boost fuel 248 passing through boost fuel conduit 242, as described in detail above. Specifically, pneumatically actuated gas valve 200 is configured for stopping the flow of boost fuel 248 when a pressure of the flow of air 250 drops below a predetermined pressure or threshold.

Referring now to FIGS. 1 and 10, a closed loop cooking system 260 will be described according to exemplary embodiments of the present subject matter. Generally speaking, closed loop cooking system 260 may be used to regulate the operation of gas burner 120 to heat a cooking utensil 262. Specifically, closed loop cooking system 260 may automatically adjust the output power of gas burner 120 in response to a measured temperature of cooking utensil 262, e.g., to perform a cooking routine while ensuring that safety limits of cooking utensil 262 are not exceeded.

In general, cooking utensil 262 may be any suitable utensil, pot, pan, dish, or other food container suitable for use or otherwise compatible with gas burner 120. Notably, as described briefly above, it is desirable to appropriately size the flames emitted from gas burner 120 to the cooking utensil 262 being heated. More specifically, safety hazards or performance inefficiencies may arise if the power output of gas burner 120 generates flames which engulf or extend up the sides of cooking utensil 262. Therefore, aspects of the present subject matter are directed to methods and systems for preventing such hazardous operation of gas burner 120.

It should be appreciated that as used herein, terms such as burner power output, fuel flow rate, burner firing rate, etc., may be used interchangeably to refer to the amount of energy or flame size used to heat cooking utensil 262. Thus, for example, the burner output may be roughly proportional or have some other known relationship to the flame size generated by gas burner 120. Similarly, the fuel flow rate provided to gas burner 120 may have a known relationship with burner output power or flame size. Thus, although the method described below refers to limiting the fuel flow rate to gas burner 120, it should be appreciated that limits could alternatively be placed on the power output or flame size of the gas burner to achieve the same safety goals while remaining within the scope of the present subject matter.

According to exemplary embodiments, controller 220 is also in communication with a temperature sensor 264. Temperature sensor 264 is separate from gas burner 120 and is configured to measure a temperature at cooking utensil 262 heated by gas burner 120. Thus, temperature sensor 264 may be a thermistor or thermocouple positioned on and/or disposed within cooking utensil 262 positioned above gas burner 120. Controller 220 receives temperature measurements from temperature sensor 264. For example, temperature sensor 264 (or cooking utensil 262 more generally) may include a wireless transmitter/receiver, such as a utensil communication module 266 (FIG. 1). In addition, controller 220 includes communication module 220F which may communicate with utensil communication module 266 wirelessly, e.g., via a Bluetooth® or Wi-Fi connection. In certain example embodiments, temperature sensor 264 is a separate component mountable to cooking utensil 262 heated by gas burner 120. In alternative example embodiments, temperature sensor 264 may be integrated within cooking utensil 262.

Utilizing temperature measurements from temperature sensor 264, controller 220 may adjust fuel regulating device 236 and regulate the flow of gaseous fuel 234 to gas burner 120. By contrast, it should be appreciated that aspects of the present subject matter may regulate the flow of fuel to any suitable gas burner. Specifically, as illustrated in FIG. 10, fuel regulating device 236 regulates the flow to primary burner 130 and/or boost burner 132 (e.g., depending on whether pneumatic gas valve 200 is open). However, according to alternative embodiments, a dedicated fuel regulating device or control valve may be operably coupled and regulated for each of primary burner 130 and boost burner 132 or an entirely different burner type or configuration may be operated, such as a single stage burner regulating by a single control valve.

During operation of closed loop cooking system 260, gas burner may be ignited and closed loop cooking system 260 may be activated. For example, the closed loop cooking system 260 or a cooking routine may be initiated in any suitable manner, e.g., via a mobile device 268, by rotating control knob 112 to a specific position, or by depressing an assisted cooking button 270 (FIG. 10). Controller 220 may then regulate the operation of fuel regulating device 236 to heat cooking utensil 262 according to a target cooking temperature. According to one exemplary embodiment, the target cooking temperature is a constant temperature set by the user or determined from a cooking recipe. Alternatively, the target cooking temperature may be a time-varying temperature profile. For example, pushing assisted cooking button 270 may initiate an automated or assisted cooking mode where the fuel regulating device 236 adjusts the flow of fuel 234 to drive the measured temperature to following a preprogrammed temperature profile.

In order to track the actual temperature of cooking utensil 262 when the closed loop control system 260 is activated, controller 220 may receive temperature measurements from temperature sensor 264 and may compare the temperature measurements to the set or target cooking temperature. Controller 220 adjusts the flow of gaseous fuel 234 to gas burner 120 with fuel regulating device 236 to reduce a difference between the temperature measurements from temperature sensor 264 and the target temperature. In particular, controller 220 may adjust fuel regulating device 236 to decrease the flow of gaseous fuel to gas burner 120 when the temperature measurements from temperature sensor 264 are greater than the target temperature. Conversely, controller 220 may adjust fuel regulating device 236 to increase the flow of gaseous fuel to gas burner 120 when the temperature measurements from temperature sensor 264 are less than the target temperature. Thus, the heat output provided by gas burner 120 may be regulated by the closed loop control system 260, e.g., without additional user input and/or monitoring.

A user may establish the set temperature via a control panel 110, via a mobile device 268 (FIG. 1), or in any other suitable manner. In this regard, for example, controller 220 is in communication with control panel 110 and is configured to receive the user-determined set temperature from control panel 110. Thus, the user may utilize control knobs 112 (or another suitable touchpad or graphical interface) on control panel 110 to establish the set temperature or a target temperature profile. As another example, control panel 110 may correspond to an application on a smartphone or other mobile device 268, and the user may utilize the application to establish the target temperature. In such example embodiments, mobile device 268 may be in wireless communication with controller 220, e.g., via a Bluetooth® or Wi-Fi connection. According to still other embodiments, controller 220 may pull cooking recipes off an Internet service or from an external server and may automatically implement such recipes when initiated by the user, e.g., when assisted cooking button 270 is pressed.

For reasons explained in more detail below, cooking utensil 262 may have an associated utensil identifier which may be communicated to controller 220, e.g., via utensil communication module 266. In general, the utensil identifier may include or communicate any suitable information that facilitates improved closed loop cooking with closed loop cooking system 260. For example, the utensil identifier may identify cooking utensil 262 by brand, model number, utensil size, or a maximum rated power or flame size. In this manner, when closed loop cooking system 260 is initiated, controller 220 may interrogate cooking utensil 262 to receive the utensil identifier and may use data from that identifier to facilitate an improve cooking process.

Specifically, for example, the utensil identifier may include a diameter 272 of cooking utensil 262. In this regard, when controller 220 identifies cooking utensil 262 prior to initiating the closed loop cooking process, controller 220 may determine a maximum fuel flow rate based at least in part on diameter 272. For example, controller 220 may store a lookup table which includes a maximum power output or a maximum fuel flow rate for each specific pan or utensil diameter. For example, the maximum power output or fuel flow rate may be around 10,000 BTUs/hr for a 7-inch pan, may be around 12,000 BTUs/hr for a 9-inch pan, or may be around 15,000 BTUs/hr for 12-inch pan. It should be appreciated that these values are only exemplary and intended to facilitate explanation of aspects of the present subject matter.

According to still other embodiments, the maximum fuel flow rate may be predetermined based on all possible compatible cooking utensils 262 for use with the gas burner 120. In other words, gas burner 120 may be specifically designed for compatibility with particular sizes or brands of cooking utensils, or vice versa. By setting the maximum fuel flow rate to the rated fuel rate for the smallest compatible pan size or cooking utensil, controller 220 may ensure safe operation of closed loop cooking system 260 any time it is paired with a compatible cooking utensil 262. Moreover, such a rated fuel rate may typically be sufficient for performing some or all commonly used cooking routines or cycles. According to such embodiments, controller 220 may further be configured for performing a compatibility check with the paired cooking utensil 262 to ensure the rated burner flame or output power is not exceeded. According to an exemplary embodiment, if a compatible utensil is not identified, controller 220 may prevent the operation of the closed loop cooking cycle.

Now that the construction and configuration of gas burner assembly 120 and closed loop cooking system 260 have been described according to exemplary embodiments of the present subject matter, an exemplary method 300 for operating a gas burner assembly will be described according to an exemplary embodiment of the present subject matter. Method 300 can be used to operate gas burner assembly 120, or any other suitable heating element or cooktop appliance. In this regard, for example, controller 220 may be configured for implementing some or all steps of method 300. Further, it should be appreciated that the exemplary method 300 is discussed herein only to describe exemplary aspects of the present subject matter, and is not intended to be limiting.

Figure 11:
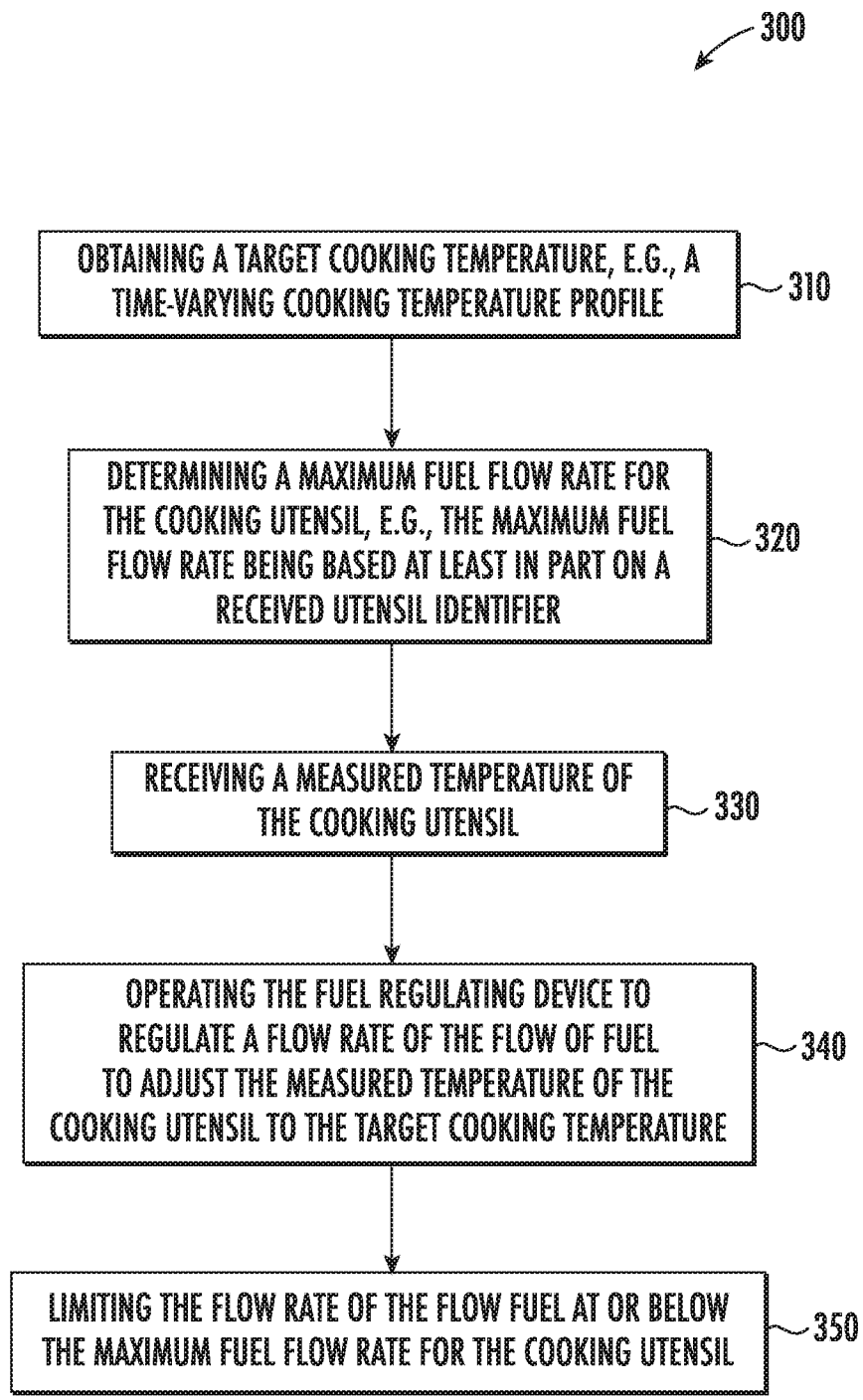
FIG. 11 is a method of operating a gas burner assembly in accordance with one embodiment of the present disclosure.

Referring now to FIG. 11, method 300 includes, at step 310, obtaining a target cooking temperature for heating a cooking utensil. In this regard, for example, the target cooking temperature may be a constant temperature, e.g., 350° F., at which a user would like to maintain a cooking utensil for performing a specific cooking process. According to still other embodiments, the target cooking temperature may be time-varying for performing an assisted cooking routine. The target cooking temperature may be selected or regulated by a user of gas burner, e.g., using control panel 110 or by communicating with controller 220 via mobile device 268. In addition, the closed loop cooking cycle may be initiated in any suitable manner, e.g., via mobile device 268, rotating control knob 112 to a specific position, or by depressing assisted cooking button 270.

Step 320 includes determining a maximum fuel flow rate for a cooking utensil. As explained above, the maximum fuel flow rate may correspond to a maximum burner output, the maximum firing rate, the maximum flame size, etc. of gas burner 120 based in part on safety or performance considerations of closed loop cooking system 260. According to an exemplary embodiment, determining the maximum fuel flow rate for the cooking utensil may include obtaining a utensil identifier from the cooking utensil that is positioned on the gas burner. Controller 220 can be configured for determining the maximum fuel flow rate based at least in part on the utensil identifier. For example, according to one embodiment, the utensil identifier includes a diameter 272 of cooking utensil 262, which may be correlated to a maximum fuel flow rate using a lookup table. According to still other embodiments, the maximum fuel flow rate can be set based at least in part on the smallest compatible cooking utensil for gas burner 120.

Step 330 includes receiving a measured temperature of the cooking utensil. As described above, cooking utensil 262 may include temperature sensor 264 which may be mounted within or on cooking utensil 262 for communicating the temperature of cooking utensil 262 to controller 220. Step 340 includes operating the fuel regulating device to regulate a flow rate of the flow of fuel to adjust a measured temperature of the cooking utensil to the target cooking temperature. In this manner, for example, the flow rate of the flow of fuel 234 to gas burner 120 may be increased or decreased to adjust the temperature of cooking utensil 262 follow a desired profile.

Step 350 includes limiting the flow rate of the flow of fuel at or below the maximum fuel flow rate for the cooking utensil. In this regard, in order to prevent safety hazards or performance issues, the closed loop cooking cycle may be limited to the maximum fuel flow rate determined at step 320. Specifically, even if the closed loop cooking routine specifies a target temperature that is greater than the measured temperature, gas burner 120 will not provide the flow of fuel 234 at a flow rate higher than the maximum fuel flow rate for the cooking utensil to avoid safety hazards.

FIG. 11 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using gas burner assembly 120 and closed loop cooking system 260 as an example, it should be appreciated that these methods may be applied to the operation of any suitable gas burner assembly or cooktop appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance comprising:
a gas burner for receiving a cooking utensil;
a fuel regulating device operably coupled to the gas burner for regulating a flow of fuel to the gas burner; and
a controller operably coupled to the fuel regulating device, the controller being configured for:
obtaining a target cooking temperature;
obtaining a utensil identifier of the cooking utensil from a utensil communication module mounted on the cooking utensil, the utensil identifier comprising a diameter of the cooking utensil;
determining a maximum fuel flow rate for the cooking utensil based at least in part on the diameter of the cooking utensil;
receiving a measured temperature of the cooking utensil heated by the gas burner; and
regulating a flow rate of the flow of fuel using the fuel regulating device to adjust the measured temperature of the cooking utensil to the target cooking temperature, wherein the flow rate is limited to the maximum fuel flow rate for the cooking utensil.

2. The cooktop appliance of claim 1, wherein determining the maximum fuel flow rate for the cooking utensil comprises:
using a lookup table correlating the utensil identifier to the maximum fuel flow rate.

3. The cooktop appliance of claim 1, wherein determining the maximum fuel flow rate for the cooking utensil comprises:
setting the maximum fuel flow rate based at least in part on a smallest compatible utensil.

4. The cooktop appliance of claim 1, wherein the target cooking temperature is a constant temperature.

5. The cooktop appliance of claim 1, wherein the target cooking temperature is a time-varying temperature profile for performing an assisted cooking routine.

6. The cooktop appliance of claim 1, wherein the controller further comprises:
a communication module in operative communication with the cooking utensil for implementing a closed loop cooking cycle.

7. The cooktop appliance of claim 1, wherein the target cooking temperature is obtained from a mobile device in operative communication with the controller, the mobile device being remote from both the cooktop appliance and the cooking utensil.

8. The cooktop appliance of claim 1, wherein the measured temperature is obtained by a temperature sensor which is separate from the gas burner.

9. The cooktop appliance of claim 8, wherein the temperature sensor is mounted on or within the cooking utensil.

10. The cooktop appliance of claim 8, wherein the temperature sensor is wirelessly connected to the controller.

11. The cooktop appliance of claim 1, wherein the gas burner comprises:
   a primary burner comprising a plurality of primary flame ports in fluid communication with a primary fuel chamber for receiving a flow of primary fuel.

12. The cooktop appliance of claim 1, wherein the gas burner comprises:
   a boost burner comprising a plurality of boost flame ports in fluid communication with a boost fuel chamber for receiving a flow of boost fuel; and
   an air pump for selectively urging a flow of air into the boost fuel chamber.

13. A method of operating a gas burner assembly, the gas burner assembly comprising a gas burner and a fuel regulating device for providing a flow of fuel to the gas burner to heat a cooking utensil, the method comprising:
   obtaining a target cooking temperature;
   obtaining a utensil identifier of the cooking utensil from a utensil communication module mounted on the cooking utensil, the utensil identifier comprising a diameter of the cooking utensil;
   determining a maximum fuel flow rate for the cooking utensil based at least in part on the diameter of the cooking utensil;
   receiving a measured temperature of the cooking utensil;
   operating the fuel regulating device to regulate a flow rate of the flow of fuel to adjust the measured temperature of the cooking utensil to the target cooking temperature; and
   limiting the flow rate of the flow of fuel at or below the maximum fuel flow rate for the cooking utensil.

14. The method of claim 13, wherein determining the maximum fuel flow rate for the cooking utensil comprises:
   using a lookup table correlating the utensil identifier to the maximum fuel flow rate.

15. The method of claim 13, wherein determining the maximum fuel flow rate for the cooking utensil comprises:
   setting the maximum fuel flow rate based at least in part on a smallest compatible utensil.

16. The method of claim 13, wherein the target cooking temperature is a time-varying temperature profile for performing an assisted cooking routine.

\* \* \* \* \*